(12) United States Patent
Anderson

(10) Patent No.: US 6,578,931 B1
(45) Date of Patent: Jun. 17, 2003

(54) DRIVE WHEEL ROLLER

(76) Inventor: Martin L. Anderson, 6852 Estes Ave. NW., Maple Lake, MN (US) 55358

( * ) Notice: Subject to any disclaimer, the term of this patent is extended or adjusted under 35 U.S.C. 154(b) by 0 days.

(21) Appl. No.: 10/177,103

(22) Filed: Jun. 21, 2002

(51) Int. Cl.[7] ............................................... B60B 35/00
(52) U.S. Cl. .................... 301/111.01; 301/121; 192/50; 403/1
(58) Field of Search ............................ 301/6.1, 111.01, 301/111.03, 111.04, 111.07, 120, 121, 114; 180/247, 385, 905; 192/50, 71; 403/1

(56) References Cited

U.S. PATENT DOCUMENTS

| | | | |
|---|---|---|---|
| 857,204 A | * | 6/1907 | Redemer |
| 2,510,434 A | * | 6/1950 | Toohey |
| 3,251,630 A | * | 5/1966 | Astley |
| 3,870,371 A | * | 3/1975 | Solomon ............... 301/111.01 |
| 4,691,934 A | * | 9/1987 | Tomse ......................... 280/503 |

* cited by examiner

Primary Examiner—Russell D. Stormer
(74) Attorney, Agent, or Firm—Nikolai & Mersereau, P.A.

(57) ABSTRACT

A drive wheel roller disengages a drive wheel on a device from the drive axle connected directly to a motor, such that the drive wheel can spin freely to move the device when the motor is not on. The axle has an aperture which aligns with an aperture on the hub of the drive wheel. When the pin is in place the drive axle and the wheel turn in unison. When the pin is removed the wheel can spin freely on a bearing located between the wheel and the axle. A screw cap locks the wheel on the axle.

3 Claims, 3 Drawing Sheets

DRIVE WHEEL ROLLER

BACKGROUND OF THE INVENTION

1. Field of the Invention

This invention relates to drive wheels on a shaft and more particularly to wheels which can be fixed to the drive shaft or rotate freely on the drive shaft.

2. Description of the Related Art

In many powered devices wheels are directly connected by a drive shaft to a motor. There are no clutches, speed changing gears or reverse gears to keep the cost and weight of the device down. When the motor is on, the wheels are powered by a direct connection from the motor through the drive shaft to the wheels. When the power is off the device becomes hard to push or pull since the wheels and the drive shaft are still connected to the motor. Some devices have a second set of wheels used when pushing or pulling the device. These wheels may be used when the device is tilted onto the second set of wheel by pushing the handle used for pushing and pulling the device downward and raising the drive wheels off the ground. The tilting requires quite a bit of effort to keep the drive wheels off the ground while pushing or pulling the device.

It is desired to have a device, which can easily be pushed or pulled on its drive wheels when the motor is off.

SUMMARY OF THE INVENTION

A drive shaft is attached to a motor and to a pair of drive wheels on other side of a motor driven device. A roller bearing placed between the drive wheel and the shaft can be used to rotate the wheel on the drive shaft without turning the drive shaft. The a wheel hub connected to the wheel has a pin through it and the drive shaft to stay fixed to the drive shaft when the motor is driving the device. The pin can be removed from the wheel hub and the drive shaft when it is desired to have the drive wheels turn freely to push or pull the device. By removing a pin for each wheel both wheels can turn freely to push or pull the device. When the device has power available again the pins can be reinserted and the device driven by the motor again.

OBJECTS OF THE INVENTION

It is an object of the invention to easily disengage a wheel from a drive shaft so that it can rotate without rotating the drive shaft.

It is an object of the invention to easily push or pull a motor driven device having a direct drive from the motor to the drive shaft when the motor is not on.

It is an object of the invention to retrofit old devices with the disengageable wheels.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
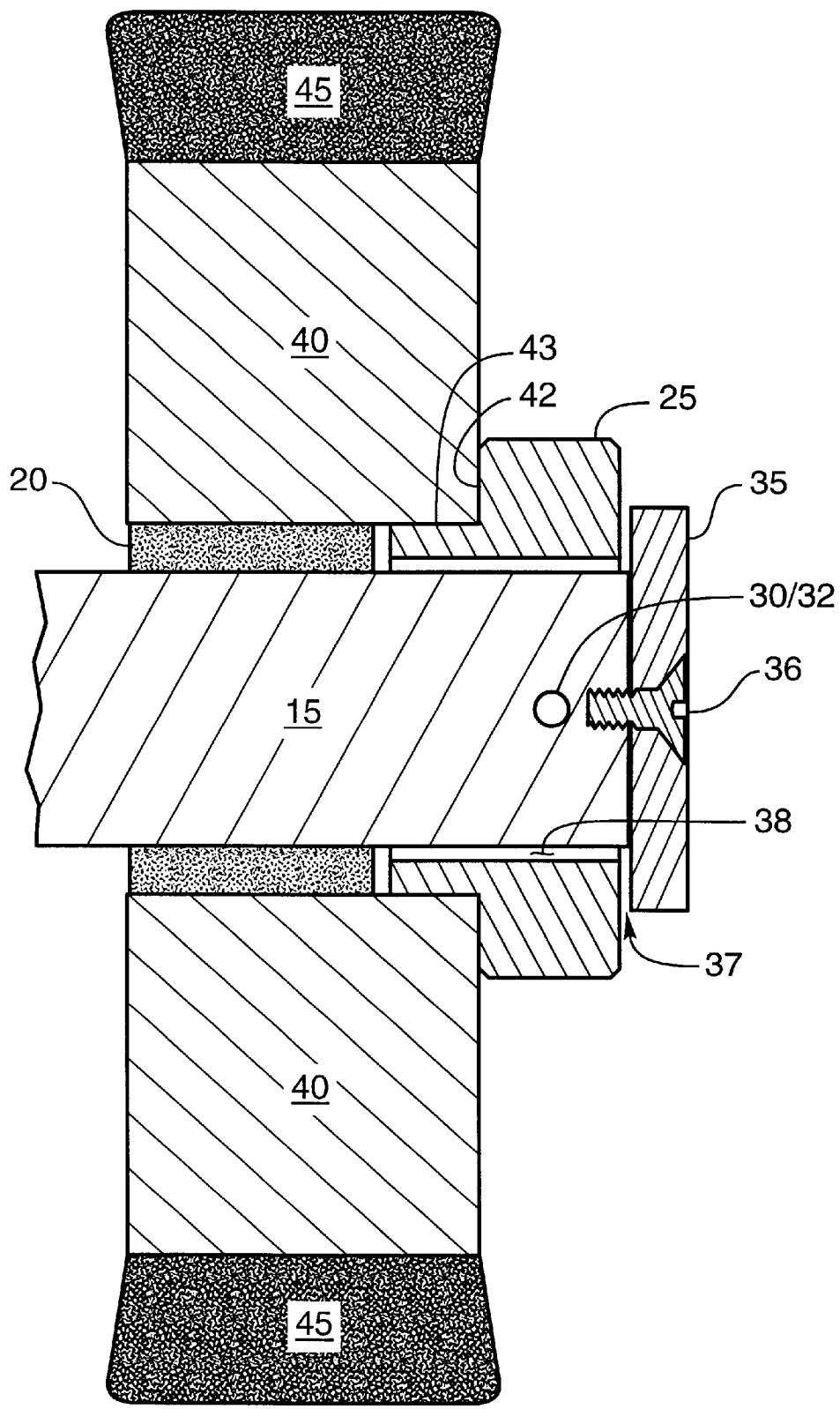
FIG. 1 is a cut away side view of the axle bearing wheel hub and screw cap
Figure 2:
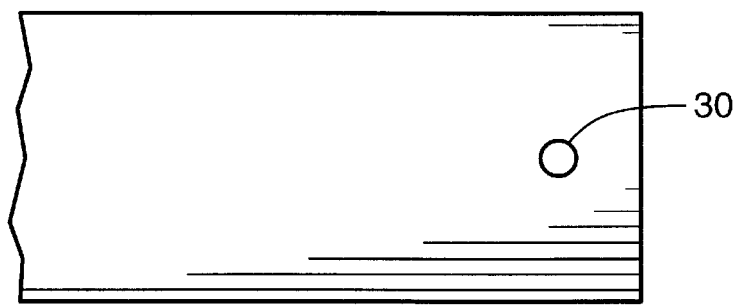
FIG. 2 is a side view of the axle.
Figure 3:
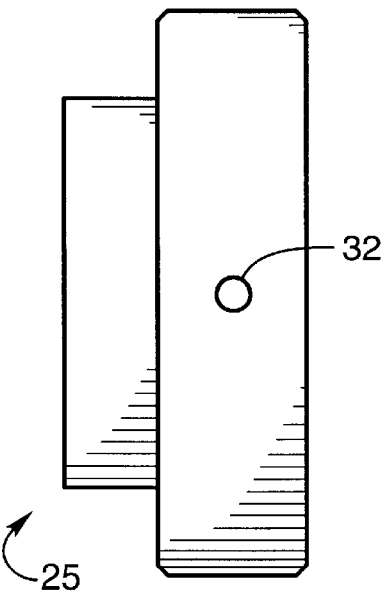
FIG. 3 is a side view of the wheel hub.
Figure 4:
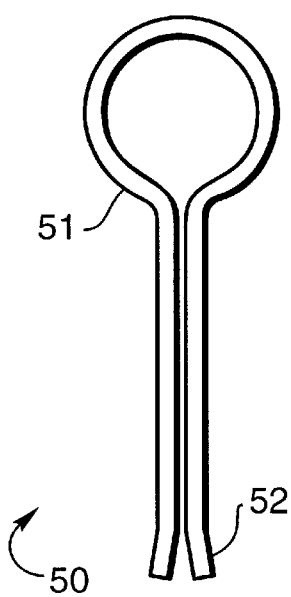
FIG. 4 is a side view of a pin with a looped top.

FIG. 1 shows a drive axle 15 which is directly connected to a motor. The drive axle 15 has a bearing 20 rotatingly attached to the axle. A wheel 40 is attached to the bearing 20 and a tire 45 is attached to the wheel. A hub 25 is attached to the wheel 40 along coplanar portions 42, 43. A gap 38 allows the hub 25 to spin on axle 15. The axle 15 and hub 25 have apertures 30 and 32 respectively which when aligned allow for a pin 50 or 70 to pass therethrough locking the rotation of the hub 25 and the axle 15 together. When pin 50 or 70 is removed the wheel 40 can rotate on the axle 15 freely and independently of the axle's rotation. A screw cap 35 having a screw 36 threaded into the axel 15 engages the axle to keep the wheel 40 in place. The screw cap 35 can be easily removed to remove the wheel 40 if desired by unscrewing screw 36 from the axle 15. When the screw cap 35 is attached to the axle 15 a small gap 37 will exist between the hub 25 and the screw cap 35.

When using a device with an axle 15 directly connected to the wheels 40 and the drive motor 60 is on the wheels 40 will turn and propel the device 100. When the drive motor 60 is off it is hard to move the device 100 when it is resting on the wheels 40, since turning the wheels 40 by pushing or pulling on the device 100 also turns the motor 60. When the motor 60 is off such as when the device 100 is being transported to a work location, the pins 50 can be pulled from the hubs 25 and axle 15 to allow the wheels 40 to spin on bearing 20 without being connected to the wheel 40 by way of hub 25 being rotatingly connecting to the axle 15. The device 100 can now be easily moved by pushing or pulling on it without having to turn motor 60.

The pin 50 preferably has a ring 51 at the top for easily pulling the pin 50 from the apertures 30, 32 in the axle 15 and the hub 25. The pin 50 may have a flared ends 52 for keeping the pin from falling out of the apertures 30, 32 or use other means for preventing the unwanted withdrawal of the pin 50. Alternatively spring pin 70 having a bail portion 71 may be used for attaching the hub 25 to the axle 15.

Although a screw cap 35 with a screw 36 is shown engaging the axle 15 to keep the wheel 40 from coming off the axle any device serving the same function may be used. Similarly even though a pin 50 or 70 is shown extending through apertures 30, 32 of the axle 15 and the hub 25 any means of locking and unlocking the axle 15 and the wheel 40 may be used.

It is preferred to use a bearing 20 having axial cylinders in the bearing race however any bearings for supporting the weight of the device while rotating the wheels on the axle are within the scope of the invention.

Figure 5:
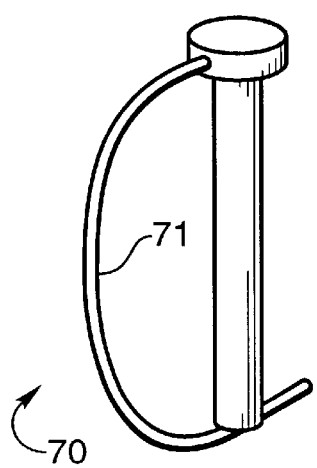
FIG. 5 is a side view of a bail pin.
Figure 6:
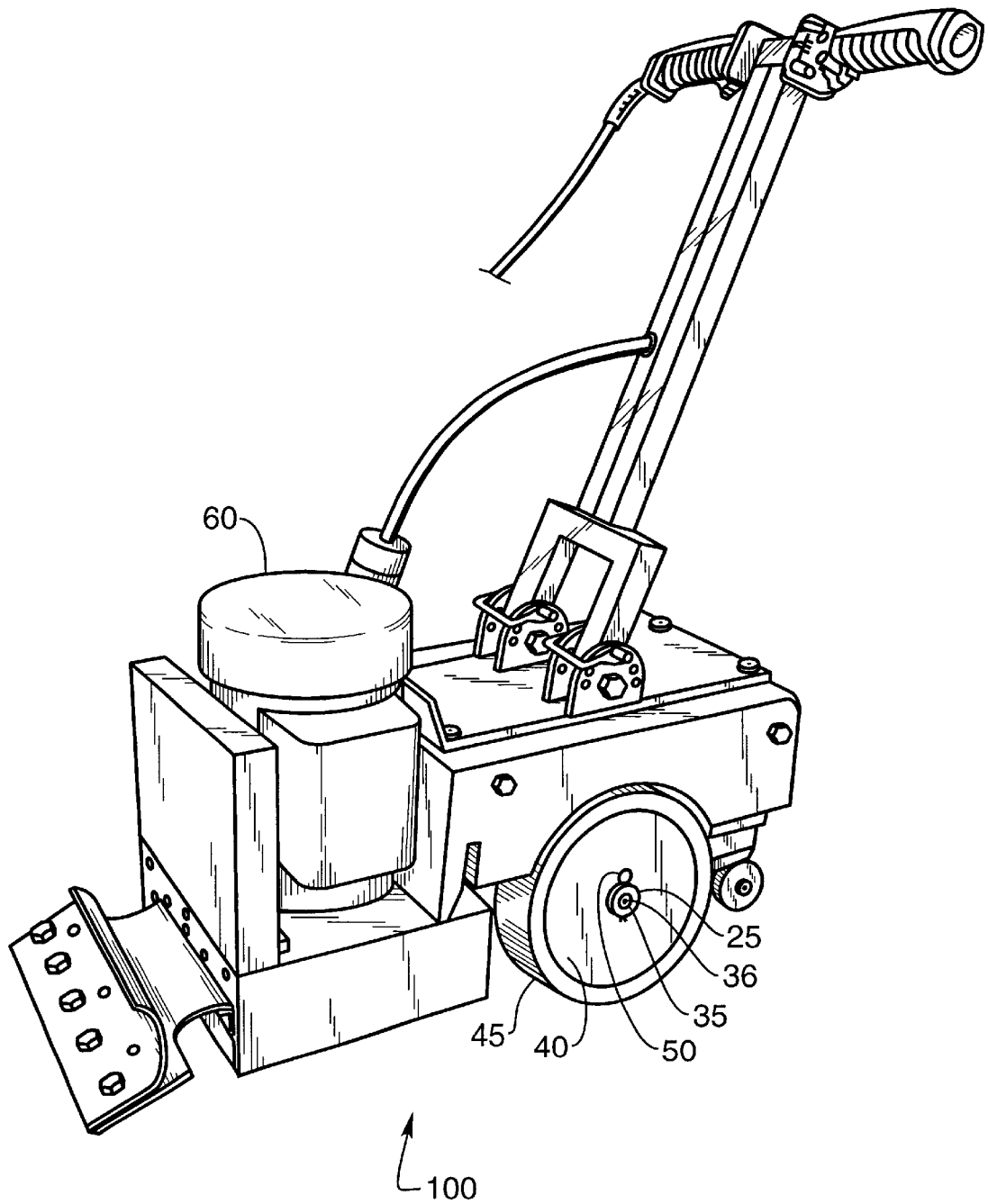
FIG. 6 is a perspective view of the drive wheel roller installed on a floor stripping machine.

It is easy to retrofit the axle and drive wheel roller on an existing device 100 such as a floor stripping machine as shown in FIG. 5 by replacing the exiting axle on the floor stripping machine with an axle 15 having an aperture 30. Then installing a wheel 40 having a bearing 20 and a hub 25 with aperture 32.

Although the device 100 shown in FIG. 5 has an electric motor 60 any type of motor may be used.

Obviously, many modifications and variations of the present invention are possible in light of the above teachings. It is therefore to be understood that, within the scope of the appended claims, the invention may be practiced otherwise than as specifically described.

What is claimed is:

1. A drive wheel roller assembly comprising:
   a device having a motor and an axle connected to the motor, the axle having a radial aperture therethrough,
   a bearing attached to the axle,
   a wheel attached to the bearing for rotating the wheel on the axle,
   a wheel hub on the wheel which engages the axle, the wheel hub having a radial aperture for alignment with the axle aperture,
   a pin for extending radially through the aperture in the wheel hub and the axle when the apertures are aligned,
   a screw cap for attachment to the axle for engaging the wheel hub to keep the wheel on the axle such that when the pin is inserted in the apertures of the wheel hub and axle the wheel spins with the axle engaging the motor, and the wheel can rotate freely on the axle when the pin is removed to easily transport the device without having to turn the motor.

2. A drive wheel roller assembly as in claim 1 having a tire on the wheel.

3. A drive wheel roller assembly as in claim 1 wherein the motor on the device is an electric motor.

* * * * *